United States Patent [19]

Tiede

[11] 4,251,939
[45] Feb. 24, 1981

[54] PROGRAMMABLE FISH LINE JIGGLER

[76] Inventor: Clair L. Tiede, R.R. #3 Box 227E, Mukwonago, Wis. 53149

[21] Appl. No.: 83,810

[22] Filed: Oct. 11, 1979

[51] Int. Cl.$^3$ .............................................. A01K 97/00
[52] U.S. Cl. ........................................ 43/19.2; 43/26.1
[58] Field of Search ................................ 43/19.2, 26.1

[56] References Cited

U.S. PATENT DOCUMENTS

| | | | |
|---|---|---|---|
| 2,643,478 | 6/1953 | Paulsen | 43/19.2 |
| 2,735,207 | 2/1956 | Christiansen | 43/19.2 |
| 2,758,407 | 8/1956 | Speidell | 43/19.2 |
| 3,001,317 | 9/1961 | Boughton | 43/19.2 |
| 3,031,790 | 5/1962 | Duryea | 43/19.2 |
| 3,600,837 | 8/1971 | Bristol | 43/19.2 |
| 3,839,810 | 10/1974 | Lagasse | 43/19.2 |

*Primary Examiner*—Nicholas P. Godici
*Attorney, Agent, or Firm*—Arthur J. Hansmann

[57] ABSTRACT

A programmable fish line jiggler having a rod holding the line and a rotatable member for moving the rod up and down and thus move the bait on the end of the line. The rotatable member has movable contacts thereon which engage the rod for inducing the up and down movement of the rod, and the contacts can be positioned in selected positions on the member so that the actual jigging action can be selected by the fisherman.

8 Claims, 6 Drawing Figures

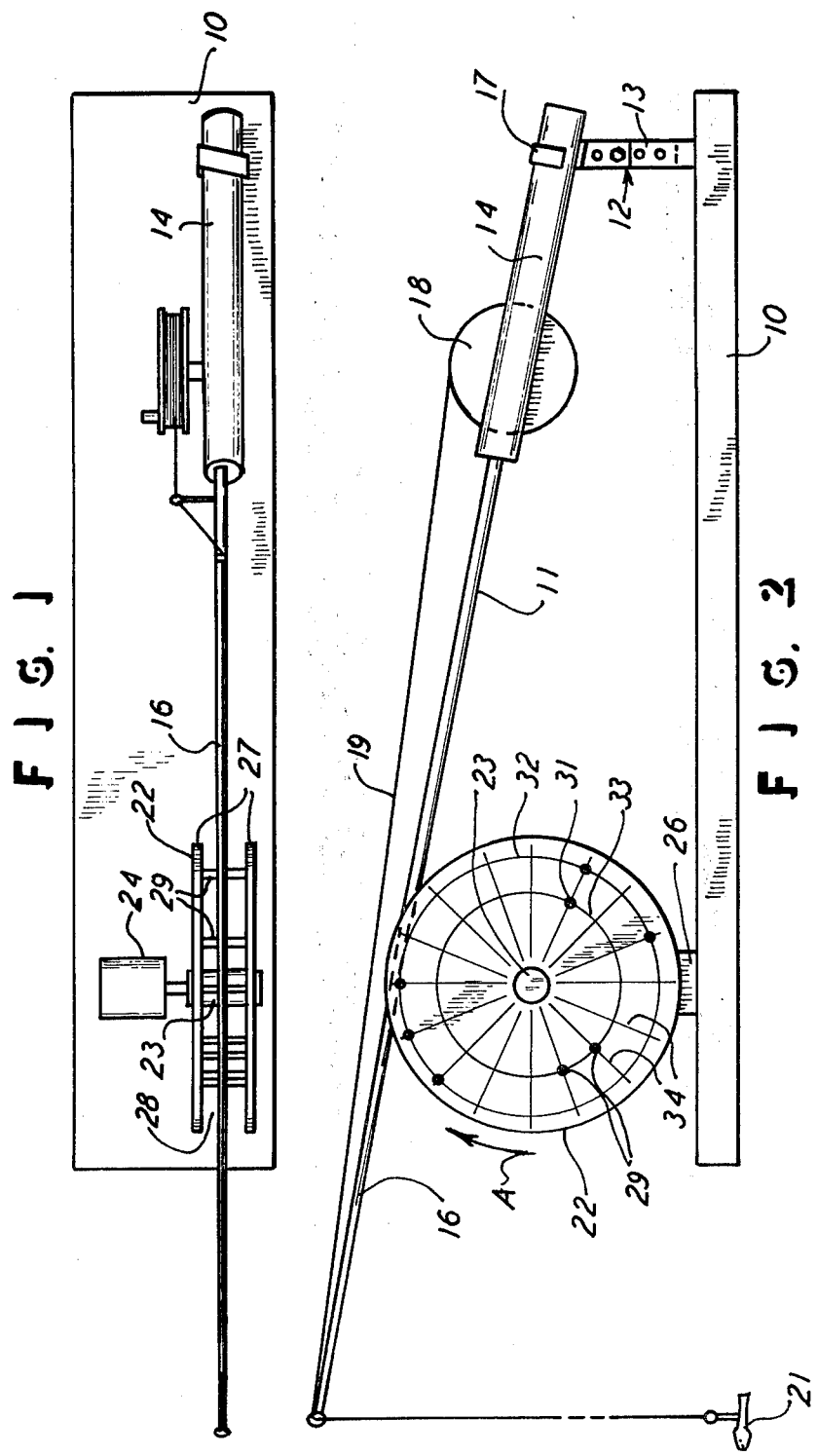

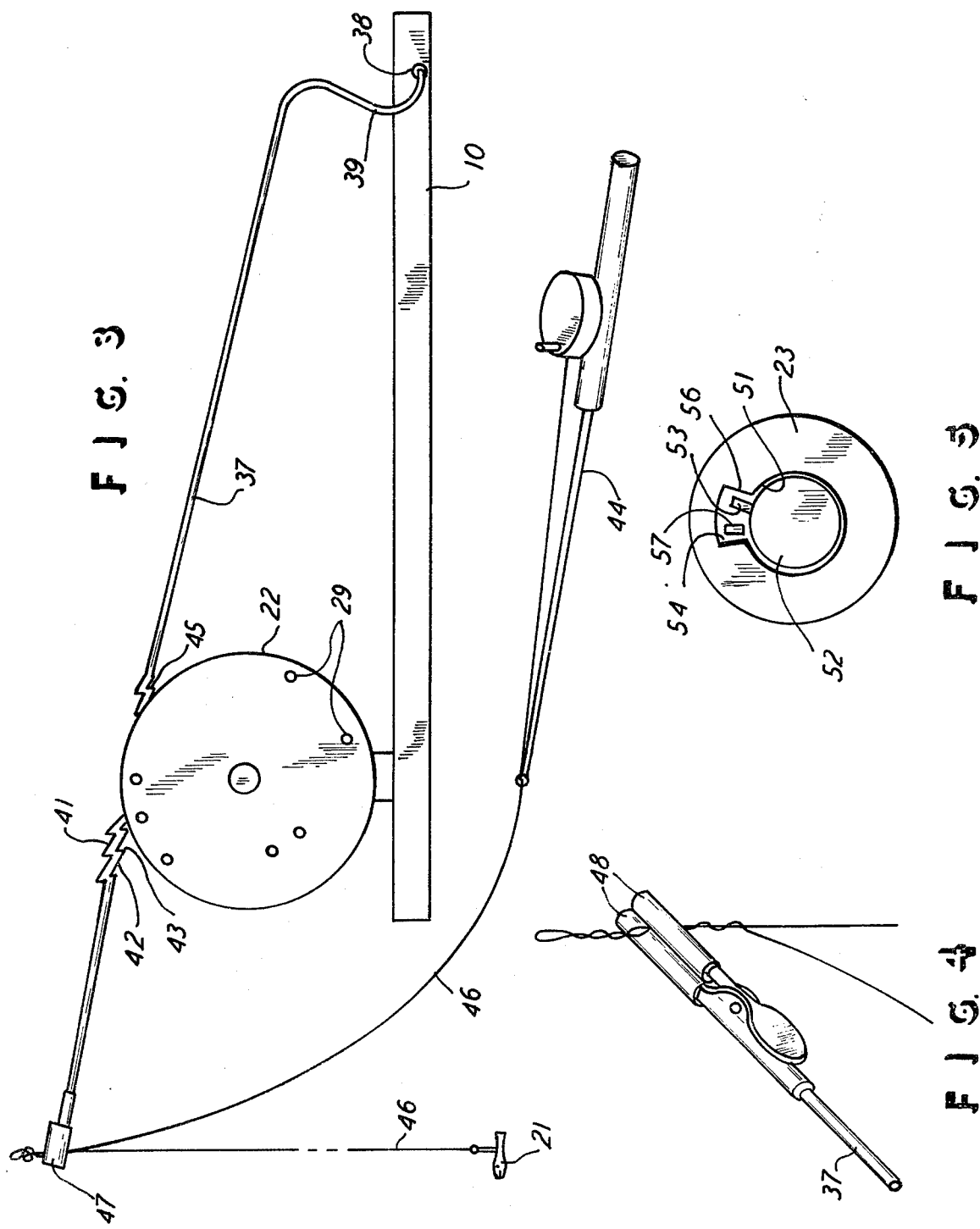

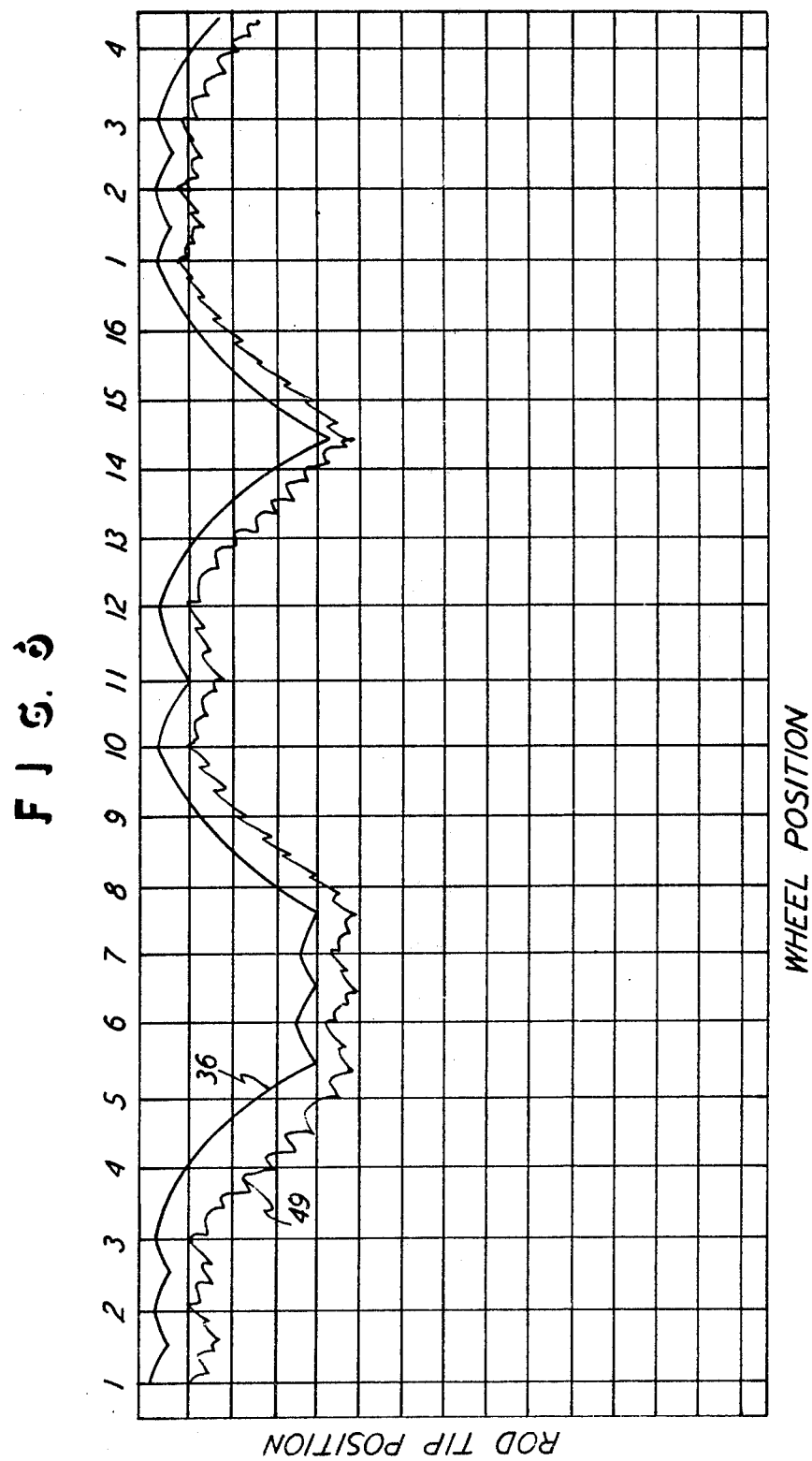

PROGRAMMABLE FISH LINE JIGGLER

This invention relates to a programmable fish line jiggler and, more particularly, it relates to an arrangement whereby a fishing rod can be moved up and down in various and selected patterns of movement for moving the fish bait suspended from the rod.

BACKGROUND OF THE INVENTION

The prior art is already aware of fish line jigglers where the fishing rod is moved up and down to move the fishing bait in the water and thereby attract the fish to the bait. Various powered devices have been employed for that purpose, and they are particularly useful where the fisherman is fishing through the ice or has more than one fish pole and line in use or where he simply does not want to constantly hold the pole or constantly jiggle the pole manually. Examples of such prior art are seen in U.S. Pat. Nos. 2,758,407 and 3,001,317 and 3,031,790. In those instances, the devices for holding the rod are powered devices or mechanisms which induce a movement to the rod for the purpose of moving the bait in the water to attract the fish. However, those prior art devices are not programmable for the purpose of permitting the fisherman to change the action of moving the rod and fishing line, at least not in a expedient and simple manner.

Still further, another example of a prior art unit as seen in U.S. Pat. No. 3,600,837, in this instance, a rotatable ratchet wheel is in contact with a specially provided finger which engages the ratchet to induce the jiggling or up and down movement of the fishing rod. However, in that instance, the fisherman cannot readily and easily alter the jiggling action but he can only select between two ratchet wheels which are arranged with uniformly spaced teeth thereon and thus can only produce a repetitious up and down rod movement of a repeated frequency and cannot produce a varying frequency or up and down rod movement as in the present invention. Further, the fishing rod of U.S. Pat. No. 3,600,837 must be specially arranged so that it has a ratchet finger affixed thereto for engaging the ratchet wheel to induce even that movement of non-varying or continuous frequency, as mentioned.

The present invention provides a programmable fish line jiggler which permits the fisherman to readily and easily change the apparatus to provide for a different pattern of movement or jiggling of the fishing line, according to the whims or effectiveness determined by the fisherman. In accomplishing this object, the apparatus of this invention is provided with movable contacts on a rotating wheel and the contacts can be readily and easily positioned in selected positions both radially and circumferentially on the wheel or rotating member, all so that the fishing rod in contact with the wheel will be moved up and down in response to the selected positioning of the contacts.

Another object and advantage of this invention is to provide a programmable fish line jiggler which has an additional feature or dimension for jiggling, namely, the rod itself can be formed with a non-linear portion which will permit the rod to be moved up and down in accordance with the configuration of the rod in that non-linear portion which is in contact with the rotatable member inducing the jiggling action.

Thus, in the present invention, a programmable fish line jiggler is provided whereby the fisherman can readily and easily change the program for jiggling the rod and thus the fishing line in accordance with his immediate desires while fishing, and only one rotatable member is required and positioning contacts on that member will accomplish the objective mentioned. Further, a conventional type of fishing rod can be employed and still the accomplishment of an effective and readily accomplished alteration of the apparatus is possible while using a standard type of fishing rod. Further, the apparatus of this invention lends itself to accommodating a specially arranged type of fishing rod which has a non-linear portion and thus provides for additional up and down movement of the rod. In summary, the apparatus of this invention is not complex nor expensive, and it is easy to use and to alter for virtually unlimited numbers of patterns of jiggling. Further, with the apparatus of this invention, the rod can move up and down in an irregular pattern of movement, rather than simple repetitious up and down movement, such as that shown by U.S. Pat. No. 3,600,837, and thus the fisherman can simulate the desired manual movement of a rod while fishing but he need not actually be inducing that movement by holding the rod himself.

Other objects and advantages will become apparent upon reading the following description in light of the accompanying drawings.

BRIEF DESCRIPTION OF THE DRAWINGS

FIG. 1 is a top plan view of one embodiment of the apparatus of this invention.

FIG. 2 is a side elevational view of the embodiment shown in FIG. 1.

FIG. 3 is a side elevational view of a modified form of the invention.

FIG. 4 is a perspective view of an enlargement of the end of the rod and showing the holding of the fishing line.

FIG. 5 is an enlarged axial view of a drive connection between the drive motor and the driven rotatable member used in the two embodiments shown.

FIG. 6 is a chart showing the various jigging actions which can be accomplished.

DETAILED DESCRIPTION OF THE PREFERRED EMBODIMENTS

FIGS. 1 and 2 show one embodiment of the invention which includes a base member 10 on which the apparatus of this invention can be supported, and it will be understood that the apparatus can be used for ice fishing or fishing from a boat or any other location. A conventional type of fishing pole 11 is shown supported on the base 10 by means of support members 12 and 13 which are suitably mounted on the base 10 and extend upwardly therefrom to engage the fishing pole handle portion 14 and dispose the fishing rod 16 in the extended and inclined position shown in FIG. 2. The supports 12 and 13 can be provided with a clamp member 17 which extends around the handle 14 for pivotly positioning the fishing pole 11 in the position shown. Also, the supports 12 and 13 can be vertically adjustable so that the angle of the fishing rod 16 with respect to the horizontal can be readily altered, if needed or desired. The fishing pole 11 includes the usual fishing line reel 18 and the line 19 itself, and the usual type of fishing lure or bait 21 is disposed at the end of the line 19, in the usual arrangement.

The rod 16 may be slightly flexible, in the conventional manner, and it will be capable of up and down movement in accordance with any force acting on the rod, such as that induced by the jiggling apparatus of this invention and as hereinafter described. The rod 16 rests downwardly off its pivot support 12 and 13 and on a rotatably mounted member or wheel 22 and is rotatable about a shaft 23 which is suitably supported on the base 10, such as by means of a driving motor 24 which has a base 26 extending upwardly from the main base 10. The motor 24 is preferably battery powered and is suitable for rotating the member or wheel 22 about its mounting spindle or shaft 23, in any suitable arrangement for inducing the rotation of the member 22 in the direction of the arrow designated A.

FIGS. 1 and 2 show that the member 22 is circular, in the form of a wheel, and it has two side members or flanges 27 which are in the form of circular plates spaced apart to present a space 28 therebetween. The fishing rod 16 is disposed between the flanges 27, and thus the rod is guided and restrained by the flanges 27 in any lateral movement of the rod 16. The wheel 22 has a plurality of contacts, in the form of pins 29, extending between the wheel disks 27 and connected thereto for movement or rotation with the rotation of the disks 27 which are connected together by the shaft or spindle 23.

FIG. 2 shows that the disks 27 have a plurality of holes 31 extending therethrough and in alignment with each other between the disks 27, and thus the pins 29 extend into the holes 31 and between the disks 27, as seen in FIG. 1. Thus the pins 29 are received in the holes 31 and are suitably secured therein, but any pin 29 can be removed from the aligned two holes 31 and also any pin 29 can be positioned in any pair of the holes 31 between the two disks 27. That is, for purposes of display and clarity, FIG. 2 shows one hole 31, but the drawing shows the two circular lines 32 and 33 and the plurality of radial lines 34 which are simply imaginary or indicated lines which show the number of and location of the holes 31, since there would be a hole 31 at the intersection of each of the circular lines 32 and 33 and the radial lines 34. That means there would be two holes 31, one on each of the circles 32 and 33, for every radial line 34, and that would be at every 22 and ½ degrees relative to the wheel 22. Accordingly, FIG. 2 shows only one of the holes 31, and that showing is for clarity, and FIG. 2 thus shows seven of the pins 29 disposed in their respective holes 31.

As described above, the member 22 is suitably rotatably mounted for rotation about its spindle 23 and it can rotate in the direction of the arrow A, and thus the various pins 29 will be positioned into contact with the fishing rod 16 when that particular pin 29 is rotated to a top position to thus contact the rod 16. That action will cause the rod 16 to move up and down, in accordance with the positioning of the pins 29 on the wheel 22. The actual movement of the rod 16, and thus the up and down movement of the fishing line and the lure 21 will be as shown in the chart in FIG. 6 and as shown by the line designated 36. That is, there are sixteen radial lines or positions extending around the wheel 22, and thus the "wheel position" in the number of sixteen positions, is shown in FIG. 6. Also, the "rod tip position" is shown in FIG. 6, and the line 36 indicates that from the position of the wheel of FIG. 2, the line 36 would move between wheel positions 1, 2, and 3, and that represents the up and down movement of the rod 16 at that time. Further rotation of the wheel 22 in the direction of the arrow A will cause the rod to engage the fourth pin 29, and before doing so the rod will have moved downwardly to where the sixth wheel position has engaged the rod and thus again move the rod upwardly, all as indicated by the chart. Of course in this arrangement the fishing pole 11 is induced to bear downwardly on the pins 29 on the wheel 22, and that means that the support 13 permits the rod 11 to bear downwardly on the wheel 22, as mentioned.

With this arrangement, it will be seen that the rod 16, and thus the lure 21, are jiggled in a pattern designated by the line 36, and that is an irregular pattern where there are small amplitudes of movement in points 1, 2, and 3 and then larger movement between points 3 and 6, and so on. Therefore, a desirable variable or alternating type of amplitude of movement is achieved by this invention. It will also be understood that the fisherman would have a supply of the pins 29, and he could position the pins in any of the holes 31 and thus achieve any desired up and down movement for the lure 21, of course within the overall confines of the apparatus being described.

FIG. 3 shows another embodiment of the invention, and it will here be noted that the wheel 22 is displayed along with the pins or contacts 29 which are spaced on the wheel 22 as they are shown in FIG. 2, and the hole 31 is omitted, again for purposes of clarity. The difference in the apparatus between the embodiment of FIGS. 1 and 2 and the embodiment of FIG. 3 is that the fishing rod is different, and in FIG. 3 there is a rod 37 which is of a flexible material and is anchored in the base 10 by extending through an opening 38 therein. That is, the rod end 39 is bendable and is positioned to project into the opening 38 and thus be anchored with the base 10, as shown in FIG. 3. The rod then extends to a position between the wheel flanges 27, as mentioned in connection with FIG. 1, and the rod has a non-linear portion 41 which is actually shown to be a serrated or zigzag portion in the length of the rod adjacent the wheel 22. It is that rod portion 41 which is in actual contact with the wheel pins 29, and thus there is an additional jiggling action created by virtue of the bends or non-linear portion 41. That is, each of the pins 29 will slide over the rod angled portions 42 and will slide off the points or peaks designated 43, and they will create a sharp up and down movement of the rod 37 during the rotation of the wheel 22, as described.

FIG. 3 further shows a conventional type of fishing pole 44 which has its fishing line 46 extending therefrom and into a clamp 47 affixed to the end of the rod 37, as best shown in FIG. 4. The clamp 47 may be of the aligator type, and the line 46 can thus be readily clamped or secured between the clamp jaws 48. Thus, a fish taking the lure 21 and pulling on the line 46 will likely pull the line from the clamp 47, and at that time the fisherman can grasp the fishing pole 44 and continue to fish by pulling the fish in through the use of the pole 44.

FIG. 6 shows the wavy and undulating line 49 which charts the pattern of the up and down movement with the apparatus utilizing the bent fishing rod 37, as shown in FIG. 3. Therefore, still another pattern of jiggling is achievable by means of this apparatus.

Still a further pattern or variation in the jiggling or up and down movement is possible by virtue of the arrangement shown in FIG. 5 where the wheel spindle or shaft 23 is shown enlarged and has a keyhole opening 51. The motor 24 has its shaft 52 extending into the opening 51 and carries a lug 53 which is positioned inside the offset portion 54 of the keyhole opening 51, as shown. Of course the lug 53 and the opening 54 are of different sizes, and thus there is a lost motion in the relative rotation between the motor shaft 52 and the wheel spindle 23. It is that lost motion of rotation which permits the wheel 22 to index or move in a non-uniform rotational pattern under the continuous drive of the motor shaft 52. That is, the shaft 52 will rotate at a continuous speed and its lug 53 will engage the spindle 23 in the keyhole 51. However, due to drag of the fishing rods on the member 22 when a pin 29 is coming up underneath the fishing rods, the wheel 32 will hesitate or stop in its rotation until the drive lug 53 physically engages the sidewall 56 of the keyhole slot 51 to thus drive the spindle 23 and therefore the wheel 22 which is mounted on the spindle 23 for rotation therewith. Still further, inserts, such as the insert 57, can be disposed in the keyhole 51 to control or vary the amount of lost motion produced by the spacing between the lug 53 and the keyhole sidewalls 56, as shown.

Therefore, in both embodiments, the fishing pole or rod is disposed so that it is in the nature of a pivot mounting at the right hand end of the rod, as viewed in these drawings, and thus the rods rest and bear downwardly on the contacts or pins 29 in the wheel 22. Therefore, the pins 29 continually raise and lower the rod in contact therewith, in accordance with the spacing of the pins 29 and also in accordance with the non-linear shape of the rod in the instance of the embodiment in FIG. 3.

Contacts 29 may be conventional bolts having heads and nuts on the outsides of the disks 27, which one skilled in the art will readily understand since the spindle 23 serves as a spacer, by being snug with the disks 27, for keeping the disks 27 apart, and the contacts 29 extend therebetween by either bolting or snug fitting as pins in holes 31. Also, the diameter of the pins or bolts 29 is relatively small, compared to the height of the risers 45 of the peaks 43, so that the pins or bolts ride along the inclines 42 and to the peaks or corner 43 and then allow the rod 37 to fall, all as shown in graph line 49. Also, the inclines 42 are in the direction of rotation of the wheel 22 at the top of the latter, as shown in FIG. 3 and to produce the sliding action of the pins 29 along the inclines 42.

What is claimed is:

1. A programmable fish line jiggler, comprising a rod, a fishing line with fishing bait thereon and attached to said rod and extending downwardly therefrom, a rotatably mounted member disposed adjacent said rod, a plurality of contacts on said member and spaced circumferentially therearound and being in operative association with said rod for moving said rod up and down, said contacts being selectively positionable on said member in both the circumferential and radial directions for moving said rod in a selected program of up and down movement in accordance with the positioning of said contacts.

2. The programmable fish line jiggler as claimed in claim 1 wherein said member is a circular wheel having two spaced-apart flanges on the circumference thereof, and said rod is disposed to extend between said flanges to be confined thereby.

3. The programmable fish line jiggler as claimed in claim 1, wherein said member is a circular wheel having two spaced-apart flanges on the circumference thereof, said wheel being disposed beneath said rod, said contacts extending axially of said wheel, and said rod is disposed to extend between said flanges to be confined thereby.

4. The programmable fish line jiggler as claimed in claim 1, 2, or 3, wherein said member has a plurality of holes spaced therearound and extending axially of said member, and said contacts being elongated for movement into and out of said holes for the selective positioning of said contacts.

5. The programmable fish line jiggler as claimed in claim 1, 2, or 3, wherein said rod includes a straight portion of a cylindrical shape disposed on said contacts to be moved up and down in the rotation of said member.

6. The programmable fish line jiggler as claimed in claim 1, 2 or 3, wherein said rod includes a non-linear portion, and said contacts are fingers in abutment with said non-linear portion, said member being of a relatively large size and said non-linear portion being reversely directed in a relatively short length along said rod to have said fingers move along said non-linear portion such that each one of said fingers individually creates a plurality of up and down movements of said rod.

7. The programmable fish line jiggler as claimed in claim 6, wherein said non-linear portion is of a serrated configuration and is disposed above said member and resting thereon.

8. The programmable fish line jiggler as claimed in claim 1, 2, or 3, including a powered device for rotating said member, and a lost motion connection between said powered device and said member for creating additional up and down movement in said rod.

* * * * *